(12) United States Patent
Chapman et al.

(10) Patent No.: US 9,352,641 B2
(45) Date of Patent: May 31, 2016

(54) INTEGRATED PICKUP TRUCK CARGO MANAGEMENT SYSTEM

(71) Applicant: Cargo Solutions Group, LLC, Pontiac, MI (US)

(72) Inventors: Paul Stewart Chapman, Rochester Hills, MI (US); Wesley Adams, Troy, MI (US)

(73) Assignee: Cargo Solutions Group, LLC, Pontiac, MI (US)

( * ) Notice: Subject to any disclaimer, the term of this patent is extended or adjusted under 35 U.S.C. 154(b) by 0 days.

(21) Appl. No.: 14/596,682

(22) Filed: Jan. 14, 2015

(65) Prior Publication Data

US 2015/0197290 A1    Jul. 16, 2015

Related U.S. Application Data

(60) Provisional application No. 61/927,144, filed on Jan. 14, 2014.

(51) Int. Cl.
| | |
|---|---|
| *B60P 7/02* | (2006.01) |
| *B60J 7/16* | (2006.01) |
| *B60R 9/06* | (2006.01) |
| *E05D 5/06* | (2006.01) |

(52) U.S. Cl.
CPC ............... *B60J 7/1607* (2013.01); *B60R 9/06* (2013.01); *E05D 5/062* (2013.01)

(58) Field of Classification Search
CPC .. B29C 65/00; B29C 66/1122; B29C 66/124; B60J 7/104; B60J 7/041; B60N 2/002; B60N 2/206; B60N 2/2833; B60N 2/2863; B60N 2/2869
USPC ............. 296/100.08, 100.02, 100.03, 100.04, 296/100.06, 100.07, 100.09; 224/404
See application file for complete search history.

(56) References Cited

U.S. PATENT DOCUMENTS

| | | | | |
|---|---|---|---|---|
| 4,543,798 | A * | 10/1985 | Page | B60N 3/103 220/524 |
| 4,824,162 | A * | 4/1989 | Geisler | B60J 7/041 16/269 |
| 4,861,092 | A * | 8/1989 | Bogard | B60J 7/141 296/100.09 |
| 4,967,944 | A * | 11/1990 | Waters | B60R 11/06 224/404 |
| 5,062,182 | A * | 11/1991 | Griffiths | E05D 3/18 16/302 |
| 5,564,773 | A * | 10/1996 | Lapsley | B60P 3/40 296/100.04 |
| 5,857,729 | A * | 1/1999 | Bogard | B60J 7/1621 296/100.02 |
| D421,736 | S * | 3/2000 | Bogard | D12/401 |
| 6,082,806 | A * | 7/2000 | Bogard | B60J 7/141 296/100.06 |
| D434,361 | S | 11/2000 | Block et al. | |
| 6,183,035 | B1 * | 2/2001 | Rusu | B60J 7/1621 296/100.01 |
| 6,203,086 | B1 * | 3/2001 | Dirks | B60R 9/00 224/404 |
| 6,227,602 | B1 * | 5/2001 | Bogard | B60J 7/141 296/100.06 |
| 6,234,559 | B1 * | 5/2001 | Block | B60J 7/1621 296/100.06 |

(Continued)

OTHER PUBLICATIONS

Exhibit A—Photograph of a "Cargo Device" that was sold more than one year before the filed of the subject application.

*Primary Examiner* — Kiran B Patel
(74) *Attorney, Agent, or Firm* — Brooks Kushman P.C.

(57) ABSTRACT

A truck bed storage system includes a pair of mounting rails each having a channel, a front cover, and a rear cover. The front cover is supported by a pair of front cover hinges attached to the pair of mounting rails. The rear cover is supported by a pair of six-bar hinges attached to the pair of mounting rails. The pair of six-bar hinges each includes a pair of tabs that engage each of the channels.

12 Claims, 7 Drawing Sheets

(56) References Cited

U.S. PATENT DOCUMENTS

| | | | |
|---|---|---|---|
| 6,322,128 B1* | 11/2001 | Karrer | B60J 7/1621 16/355 |
| 6,338,520 B2* | 1/2002 | Rusu | 248/231.51 |
| 6,439,639 B1* | 8/2002 | Branting | B60J 7/041 280/423.1 |
| 6,520,558 B1 | 2/2003 | Katterloher et al. | |
| 6,618,904 B1* | 9/2003 | Nagy | E05D 3/145 16/288 |
| 6,948,758 B2 | 9/2005 | Henderson | |
| 7,021,693 B2 | 4/2006 | Keller | |
| 7,131,684 B1* | 11/2006 | Gooding | B60J 7/141 296/100.07 |
| 7,278,674 B1* | 10/2007 | Bogard | B60J 7/1621 296/100.06 |
| 7,322,633 B2 | 1/2008 | Zajicek et al. | |
| 7,748,767 B2* | 7/2010 | Terhaar | B60J 7/1621 16/231 |
| 7,794,004 B2* | 9/2010 | Aebker | B60R 5/04 296/37.8 |
| 8,931,819 B2* | 1/2015 | Daniel | B60J 7/1621 29/428 |
| 9,039,066 B1* | 5/2015 | Yue | B60P 7/02 296/100.09 |
| 2001/0050494 A1* | 12/2001 | Rusu | B60J 7/1621 296/100.07 |
| 2002/0130527 A1* | 9/2002 | Henderson | B60J 7/141 296/37.6 |
| 2004/0195857 A1* | 10/2004 | Chverchko | B60J 7/1621 296/100.07 |
| 2004/0245799 A1* | 12/2004 | Rusu | B62D 25/10 296/100.06 |
| 2005/0029832 A1* | 2/2005 | Verduci | B60J 7/19 296/100.06 |
| 2007/0035151 A1* | 2/2007 | Rusu | B60J 7/1621 296/100.01 |
| 2008/0168793 A1* | 7/2008 | Hottmann | E05D 3/16 62/441 |

* cited by examiner

INTEGRATED PICKUP TRUCK CARGO MANAGEMENT SYSTEM

BACKGROUND

This application relates to a cargo management system for a box area or bed of a pickup truck. Pickup truck owners carry a wide range of material, equipment, and tools outside of the cab of their trucks. Some owners utilize a tool box mounted to the front of the truck bed to securely store any items outside of the cab of the truck. However, tool boxes have a limited amount of storage space and cannot secure larger items. Other owners utilize a bed cover extending over the entire bed area of the truck. Bed covers allow for larger items which are placed in the bed of the truck to be covered, but allows items stored this way to move around the truck bed during transport. Therefore, there is a need for an improved system which provides compartmentalization and encloses the pickup bed.

SUMMARY

A truck bed storage system includes a pair of mounting rails each having a channel, a front cover, and a rear cover. The front cover is supported by a pair of front cover hinges attached to the pair of mounting rails. The rear cover is supported by a pair of six-bar hinges attached to the pair of mounting rails. The pair of six-bar hinges each includes a pair of tabs that engage each of the channels.

A truck bed storage system includes a cargo compartment having a seal flange at least partially surrounding the cargo compartment, a front cover, and a rear cover. The front cover encloses the cargo compartment and includes a front perimeter seal for engaging at least a portion of the seal flange. The rear cover encloses a portion of the truck bed and includes a rear perimeter seal for engaging at least of portion of the seal flange.

These and other features of the disclosed examples can be understood from the following description and the accompanying drawings, which can be briefly described as follows.

DETAILED DESCRIPTION

Figure 1:
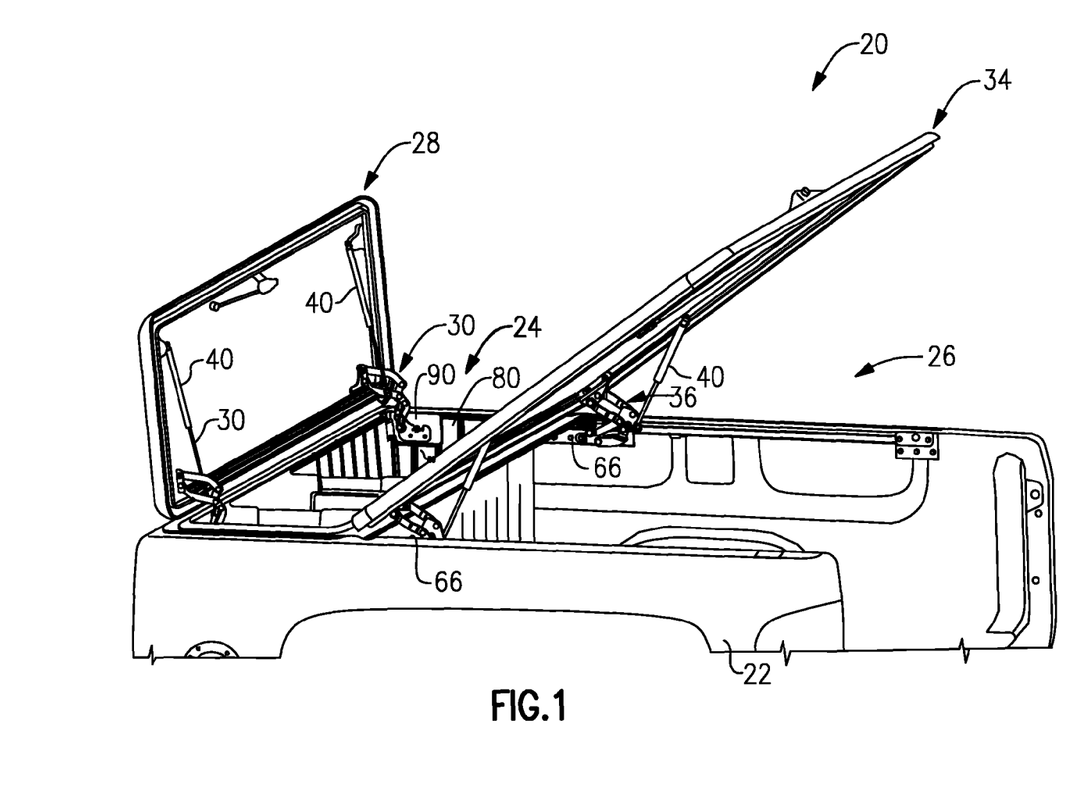
FIG. 1 illustrates a truck bed with an example truck bed storage system.

FIG. 1 illustrates a truck bed storage system 20 located in a truck bed 22 for storing and securing items in the truck bed 22. The truck bed storage system 20 includes a front compartment 24 and a rear compartment 26. The front compartment 24 includes a front cover 28 attached to a pair mounting rail 66 by a pair of hinges 30 adjacent to a cargo compartment 80. The rear compartment 26 includes a rear cover 34 hingeably attached to the pair of mounting rails 66 on the truck bed 22 by a pair of hinges 36 to cover a rear portion of the truck bed 22. Support struts 40 attach to the pair of hinges 30, 36 to maintain the front and the rear covers 28, 34, respectively, in an open position.

Figure 2:
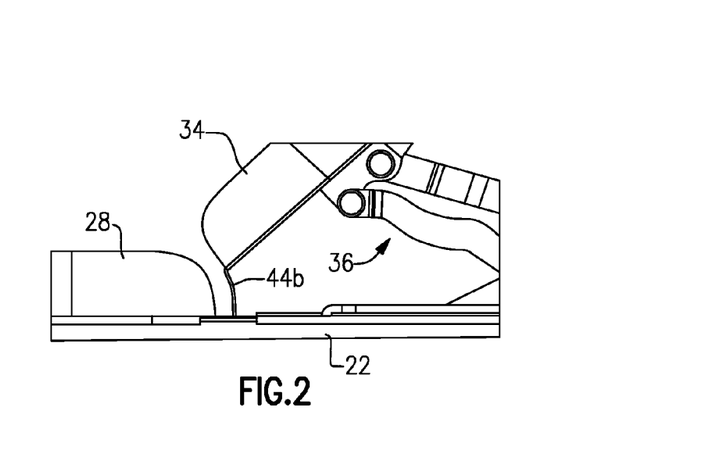
FIG. 2 illustrates an example rear cover and front cover.
Figure 3:
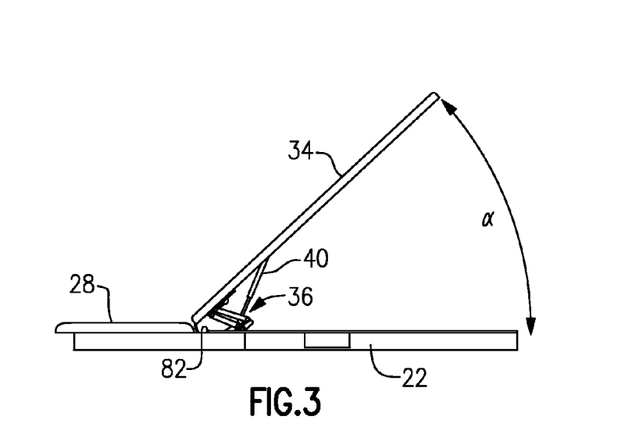
FIG. 3 illustrates the rear cover in an open position and the front cover in a closed position.

FIGS. 2 and 3 illustrate the rear cover 34 in an open position and the front cover 28 in a closed position. The hinges 36 allow the rear cover 34 to lift directly away from a seal flange 82 and prevent the rear cover 34 from interfering with the closed front cover 28 as the rear cover 34 is moved between an open and closed position. The hinges 36 also protect a lip 108 located on a panel perimeter seal 104 (FIG. 17) by preventing the rear cover 34 from scuffing the lip 108 causing premature wear by lifting the rear cover 34 vertically upward. In the illustrated example, the rear cover 34 opens to an opening angle α of approximately 40 degrees.

Figure 4:
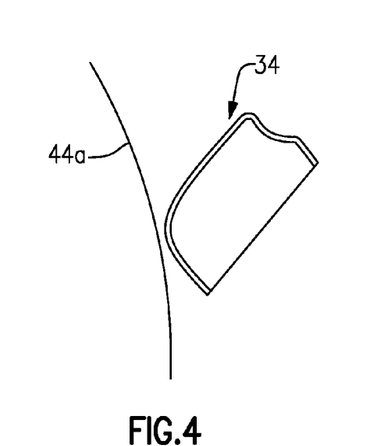
FIG. 4 illustrates a front cover swing path relative to the rear cover in the open position.

FIG. 4 illustrates a swing path 44a for the front cover 28 and FIG. 2 illustrates a swing path 44b for the rear cover 34. The swing paths 44a, 44b allow the front cover 28 and the rear cover 34 to be opened simultaneously without interference.

Figure 5:
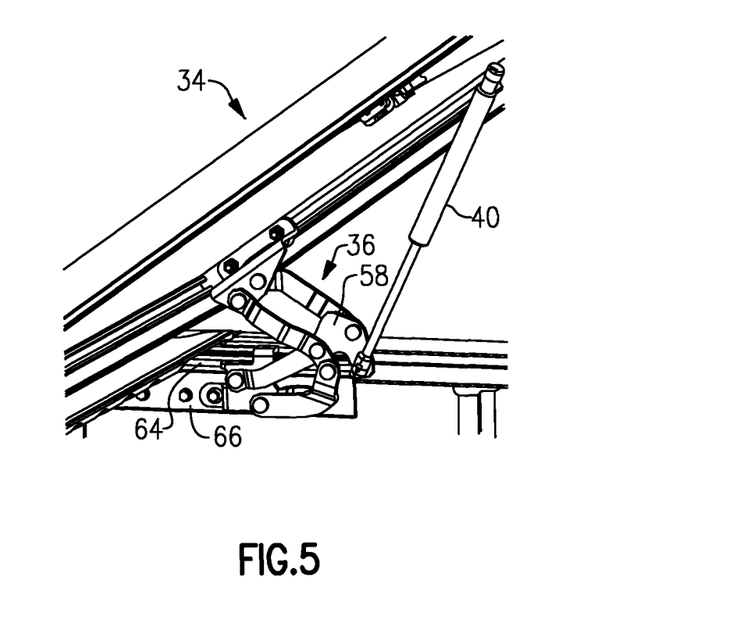
FIG. 5 illustrates a perspective view of the rear cover in the open position.

As shown in FIG. 5, the support strut 40 is attached directly to a strut link 58 on the hinge 36. By attaching the support strut 40 to the strut link 58, a lifting/support mechanism located along the side of the truck box is eliminated which would otherwise obstruct access particularly to the forward area of the truck bed 22. Attaching the support strut 40 to the hinge 36 significantly increases the loads carried by the hinge 36 requiring additional strengthening provisions both in configuration of the links and the material used in the hinges 36.

Figure 6:
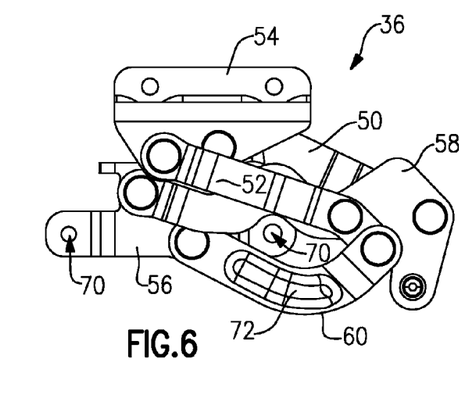
FIG. 6 illustrates an example rear cover hinge for a first side.
Figure 7:
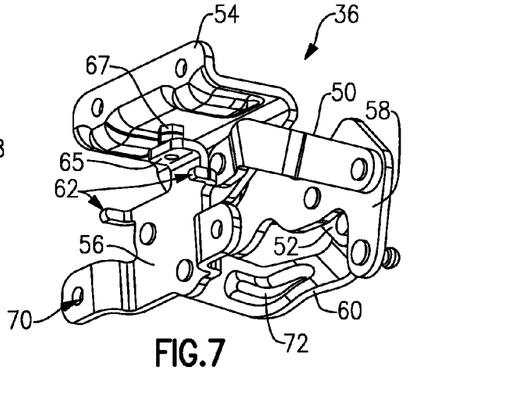
FIG. 7 illustrates an example rear cover hinge for a second side.

The hinges 36 shown in FIGS. 6 and 7 pivotably attach opposing sides of the rear cover 34 to each of the pair of mounting rails 66, which is attached to the truck bed 22. In the illustrate example, the hinges 36 shown in FIGS. 6 and 7 are mirror images of each other, but are otherwise identical. Each of the hinges 36 is a six-bar hinge and includes a first link 50, a second link 52, a cover link 54, a mounting link 56, the strut link 58, and a reinforced link 60.

The strut link 58 and the reinforced link 60 are pivotably attached to the mounting link 56. The first link 50, the second link 52, and the mounting link 56 are pivotably attached to the strut link 58. The cover link 54, the strut link 58, and the reinforced link 60 are pivotably attached to second link 52. The second link 52 and the first link 50 are pivotably attached to the cover link 54. The cover link 54 and the strut link 58 are pivotably attached to the first link 50. The second link 52 and the mounting link 56 are pivotably attached to the reinforced link 60.

Figure 11:
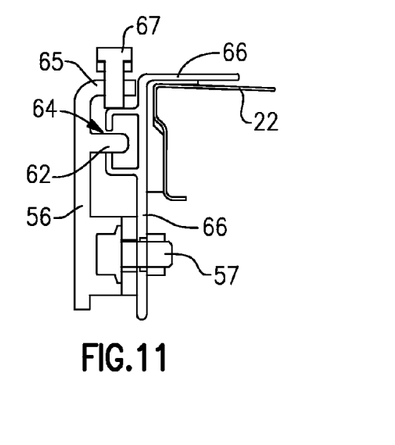
FIG. 11 illustrates a cross-sectional view of the hinge for the rear cover attached to an example mounting rail.

The mounting link 56 includes mounting tabs 62 that extend generally perpendicularly from the mounting link 56 for engaging a channel 64 in the mounting rail 66 (FIGS. 5 and 11). The mounting tabs 62 at least partially secure the hinge 36 to the mounting rail 66 during installation to allow the hinge 36 to slide in the channel 64 along the mounting rail 66 without secondary fasteners during installation. The mounting tabs 62 also aid in resisting torsional forces applied to the hinge 36 and allow the hinge 36 to support the rear cover 34 without the need for a secondary support/fastener while the hinge 36 is being securely attached to the mounting rail 66 with fasteners 57 (FIG. 11). The mounting link 56 also includes a rail flange 65 that includes an adjustment member 67, such as a bolt, that engages a portion of the mounting rail 66 to ensure that the mounting tabs 62 slide through the channel 64 in the mounting rail 66 during installation.

Figure 9:
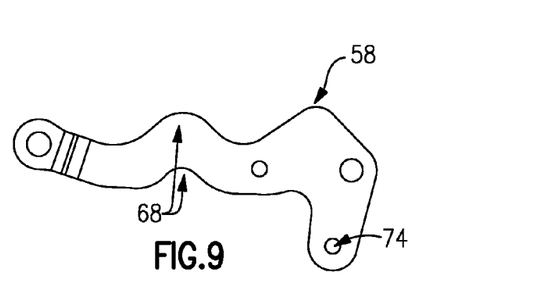
FIG. 9 illustrates an example strut link.
Figure 10:
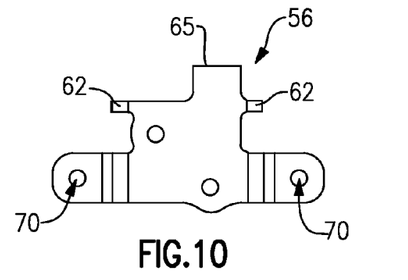
FIG. 10 illustrates an example mounting link.

As shown in FIGS. 6 and 9, the strut link 58 includes a curved mid-portion 68 to provide a fastener path to fastener holes 70 in the mounting link 56. The curved mid-portion 68 allows the mounting link 56 to be compact while still providing easy accessibility to the fastener holes 70 in the mounting link 56. A strut opening 74 extends through a distal end of the strut link 58 to pivotably attach the support strut 40 to the strut link 58.

Figure 8:
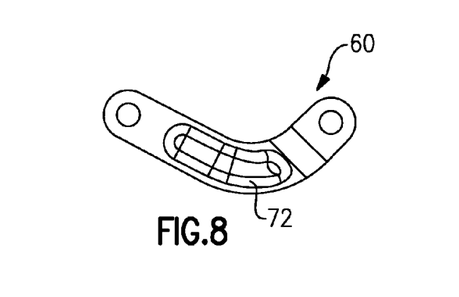
FIG. 8 illustrates an example reinforcement link.

The reinforced link 60 includes an elongated rib 72 that provides additional rigidity to the reinforced link 60 so that the hinge 36 can withstand the forces generated by the support strut 40 and the rear cover 34. The elongated rib 72 generally follows a curved contour of the reinforced link 60 and extends longitudinally along the reinforced link 60.

Figure 12:
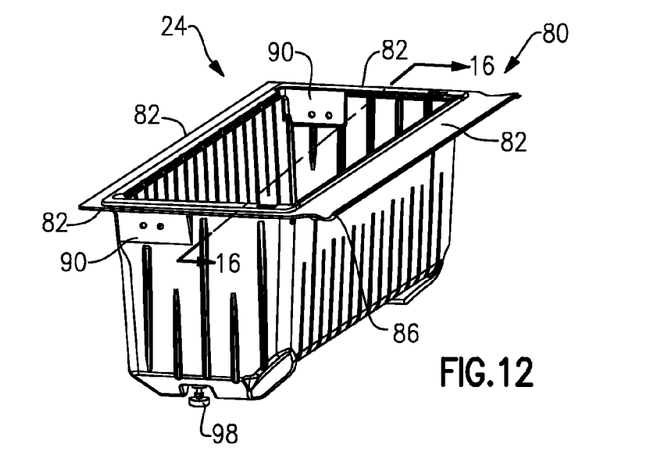
FIG. 12 illustrates an example cargo compartment.
Figure 13:
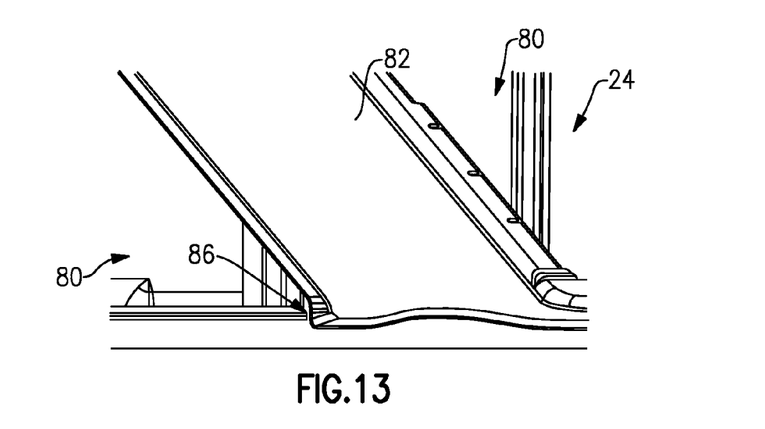
FIG. 13 illustrates an example seal flange on the cargo compartment of FIG. 12.
Figure 14:
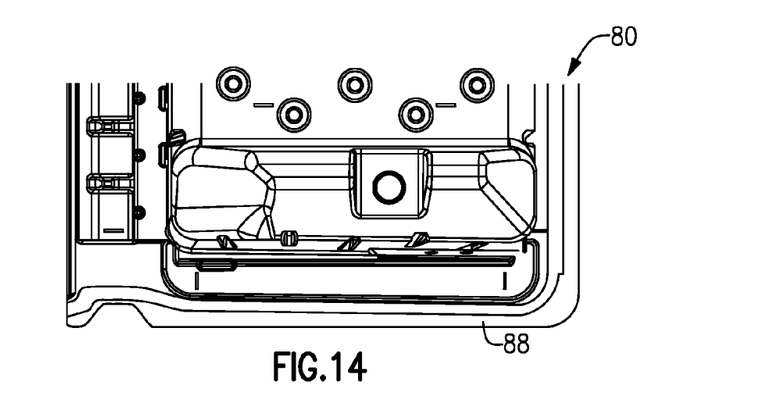
FIG. 14 illustrates a bottom view of the cargo compartment of FIG. 12.

Referring to FIGS. 12-14, the front compartment 24 includes the cargo compartment 80 having walls and a floor made of a composite polymer material. The seal flange 82 surrounds an upper perimeter of the cargo compartment 80 and includes a transition portion 86 along rear outer edges to accept the rear cover 34. An underside seal track 88 extends along a bottom edge portion of the front and sides of the seal flange 82 for sealing the cargo compartment 80 to the truck bed 22.

Figure 15:
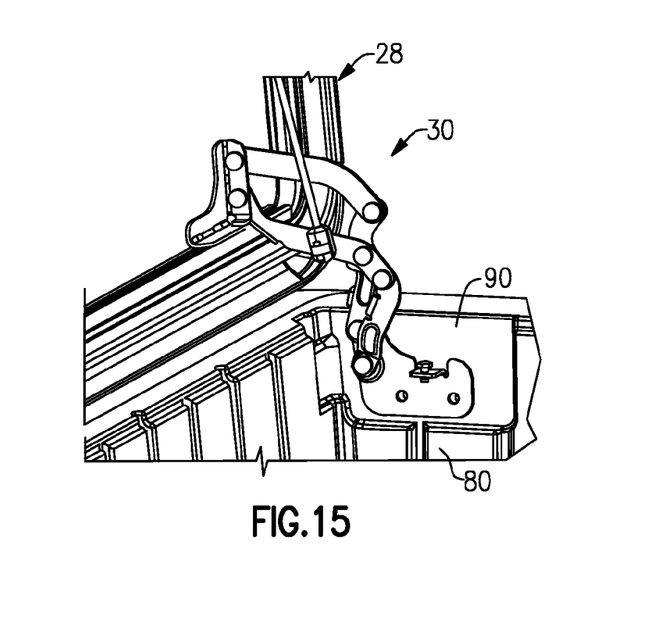
FIG. 15 illustrates a perspective view of a hinge for the front cover.

As shown in FIGS. 12 and 15, the cargo compartment 80 includes mounting portions 90 on opposing sides along upper edges of the front of the cargo compartment 80 for mounting the pair of hinges 30 to the mounting rail 66 (FIG. 1) through the cargo compartment 80.

Figure 16:
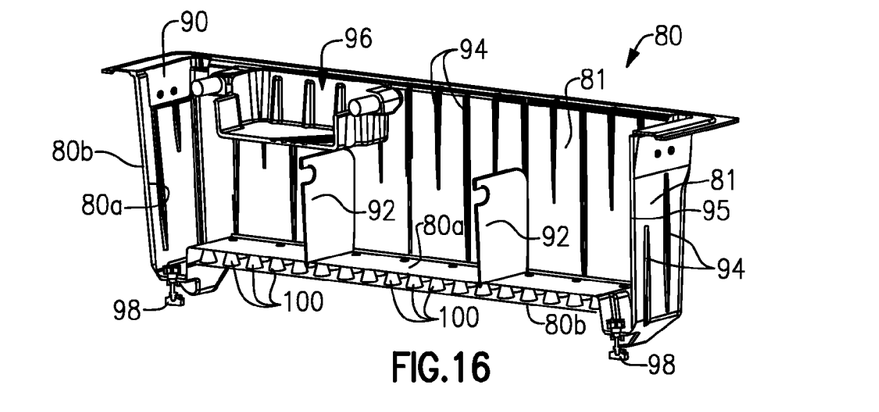
FIG. 16 illustrates a sectional view taken along line 16-16 of the cargo compartment of FIG. 12.

FIG. 16 illustrates a sectional view of the cargo compartment 80 taken along line 16-16 of FIG. 12. The cargo compartment 80 includes a polymer inner wall 80a that defines an inner surface of a base and sidewalls 81 of the cargo compartment 80 and a polymer outer wall 80b that defines an outer surface of the base and sidewalls 81 of the cargo compartment 80. The polymer outer wall 80b includes a plurality of protrusions 100, such as cones, that project upward from the outer wall 80b toward the inner wall 80a to reinforce the base of the cargo compartment 80. The plurality of protrusions 100 is sandwiched by the inner wall 80a and the outer wall 80b to form a geometric composite structure.

The inner wall 80a and the outer walls 80b include a plurality of corresponding ribs 94. The plurality of corresponding ribs 94 include a portion on the outer wall 80b that extends inward to engage a portion on the inner wall 80a that extends outward. An inner cavity 95 is formed between the inner wall 80a and the outer wall 80b to create a dual wall configuration. The plurality of corresponding ribs 94 increase the strength and rigidity of the cargo compartment 80 and may also accept dividers 92 to create compartments with adjustable sizes within the cargo compartment 80.

The dual wall configuration also acts as an insulator which influences the ambient conditions within the cargo compartment 80. This gives the consumer the opportunity to use the cargo compartment 80 as a cooler and also assists in the control of dew point moisture accumulation in hot humid conditions which is a common problem with aluminum tool boxes.

The cargo compartment 80 also includes at least one tray 96 that extends between opposing sidewalls 81 for storing smaller items so the smaller items do not fall to the bottom of the cargo compartment 80 and become difficult to retrieve. Multiple jack screws 98 are located along the bottom of the cargo compartment 80 for supporting and leveling the cargo compartment 80.

Figure 17:
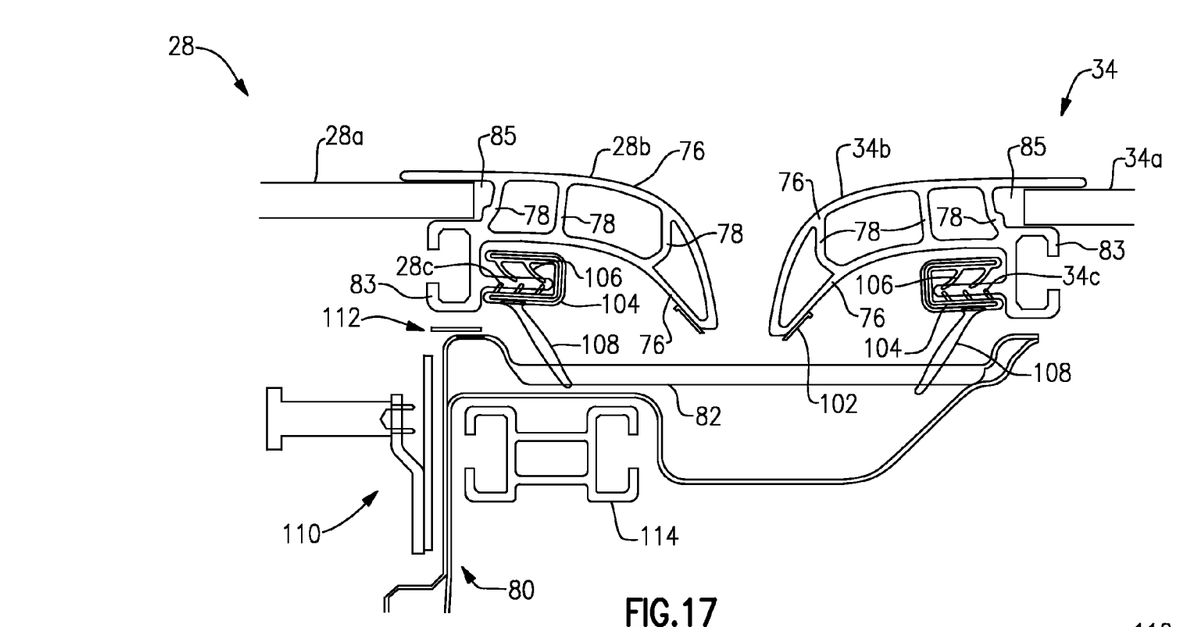
FIG. 17 illustrates a cross-sectional view of the front cover and the rear cover along the center line of the cargo compartment through a rear seal flange.

As shown in FIG. 17, the front cover 28 includes a front panel 28a and a front panel rail 28b that surrounds the front panel 28a and the rear cover 34 includes a rear panel 34a and a rear panel rail 34b that surrounds the rear panel 34a. The front panel rail 28b and the rear panel rail 34b include a generally curved double wall 76 that curves toward the seal flange 82 and is connected by multiple ribs 78 and.

A first snow seal 102 extends along a distal edge of the rear panel rail 34b along a front side of the rear cover 34 and a second snow seal 102 extends along a distal edge of the front panel rail 28b along a front of the front cover 28. (Not shown). The front and rear panel rails 28b, 34b each include a first and a second tab 28c, 34c, respectively, extending from a C-shaped support 83 for securing a perimeter seal 104. The perimeter seal 104 includes multiple retention members 106, such as flexible retention fingers, for securing the perimeter seal 104 to the first and second tabs 28c, 34c, respectively. A lip 108 extends from a lower portion of the perimeter seal 104 and engages the seal flange 82 which extends around the perimeter of the cargo compartment 80.

Figure 18:
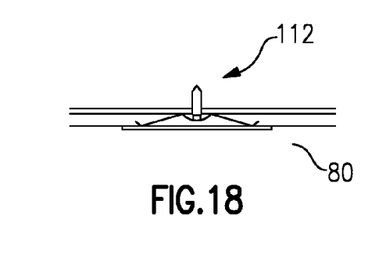
FIG. 18 illustrates an example pop-up spring reaction member.

A front cover latch striker 110 for latching the front cover 28 is located adjacent the rear of the cargo compartment 80. A pop-up spring reaction member 112 is placed adjacent the front cover latch striker 110 along an upper edge of the cargo compartment 80 (FIGS. 17 and 18) to provide feedback to the user that the front cover latch striker 110 is engaged to secure the front cover 28 by providing a click.

A cross member 114 extends along an underside of the rear of the seal flange 82 between the opposing mounting rails 66 on the truck bed 22. The cross member 114 provides rigidity to the seal flange 82 and locates the cargo compartment 80 relative to the truck bed 22.

The preceding description is exemplary rather than limiting in nature. Variations and modifications to the disclosed examples may become apparent to those skilled in the art that do not necessarily depart from the essence of this disclosure. Any discussion of front and rear is relative to the truck bed 22 for the vehicle unless stated otherwise. The scope of legal protection given to this disclosure can only be determined by studying the following claims.

What is claimed is:

1. A truck bed storage system comprising:
   a pair of mounting rails each including a channel;
   a front cover supported by a pair of front cover hinges attached to the pair of mounting rails; and
   a rear cover supported by a pair of six-bar hinges attached to the pair of mounting rails, wherein the pair of six-bar hinges each include a pair of tabs that engage each of the channels.

2. The storage system of claim 1, wherein front cover encloses a cargo compartment.

3. The storage system of claim 2, wherein the cargo compartment includes a polymer inner wall spaced inward from a polymer outer wall.

4. The storage system of claim 3, wherein a base portion of the outer wall includes a plurality of protrusions that engage a base portion of the inner wall.

5. The storage system of claim 3, wherein the inner wall includes a first plurality of ribs that engage a second plurality of ribs on the outer wall.

6. The storage system of claim 5, wherein the first plurality of ribs and the second plurality of ribs are located on a sidewall of the cargo compartment and form a cavity between the inner wall and the outer wall.

7. The storage system of claim 3, wherein at least one of the inner wall and the outer wall form a seal flange extending between the front cover and the rear cover.

8. The storage system of claim 7, wherein the front cover includes a front panel surrounded by a front panel rail including a front perimeter seal that at least partially engages the seal flange and the rear cover includes a rear panel surrounded by a rear panel rail including a rear perimeter seal that at least partially engages the seal flange.

9. The storage system of claim 1, wherein the pair of tabs extends from a mounting link of the six-bar linkage and the mounting link includes a pair of fastener openings for securing the mounting link to a corresponding mounting rail.

10. The storage system of claim 9, further comprising a reinforced link pivotably attached to the mounting link including an elongated rib that follows a curved contour of the reinforced link.

11. The truck bed storage system of claim 10, further comprising a strut link pivotably attached to the mounting link and a strut pivotably attached to the strut link for supporting the rear cover.

12. The storage system of claim 11, wherein the strut link includes a curved mid-portion aligned with one of the fastener openings in the mounting link.

* * * * *